(12) United States Patent
Morita

(10) Patent No.: US 8,687,235 B2
(45) Date of Patent: Apr. 1, 2014

(54) PRINT SAVING PAGE DEDUCTION SUPPRESSION PROCESSING MINIMIZING THE NUMBER OF COLOR PAGES

(75) Inventor: Keisuke Morita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 13/419,781

(22) Filed: Mar. 14, 2012

(65) Prior Publication Data

US 2012/0236336 A1 Sep. 20, 2012

(30) Foreign Application Priority Data

Mar. 16, 2011 (JP) ................. 2011-058103

(51) Int. Cl.
- H04N 1/387 (2006.01)
- H04N 1/50 (2006.01)
- G06F 3/12 (2006.01)
- G06K 15/02 (2006.01)
- H04N 1/23 (2006.01)

(52) U.S. Cl.
CPC ............ *G06F 3/1204* (2013.01); *G06F 3/1218* (2013.01); *G06F 3/1239* (2013.01); *G06F 3/1241* (2013.01); *G06F 3/1242* (2013.01); *G06F 3/1252* (2013.01); *G06K 15/1823* (2013.01); *G06K 15/1852* (2013.01); *G06K 15/1868* (2013.01); *G06K 15/1889* (2013.01); *H04N 1/233* (2013.01); *H04N 1/2369* (2013.01); *H04N 1/2384* (2013.01); *H04N 1/3872* (2013.01); *H04N 1/50* (2013.01)

USPC .......... 358/2.1; 358/3.24; 358/1.18; 358/538; 382/164; 382/282; 382/284; 382/293; 715/253

(58) Field of Classification Search
None
See application file for complete search history.

(56) References Cited

U.S. PATENT DOCUMENTS

| 8,432,574 B2* | 4/2013 | Kato ............................ 358/1.18 |
| 2011/0170122 A1* | 7/2011 | Kihara et al. ................ 358/1.18 |
| 2012/0236357 A1* | 9/2012 | Cech et al. ................... 358/1.15 |

FOREIGN PATENT DOCUMENTS

JP 2007-140766 A 6/2007

* cited by examiner

Primary Examiner — Scott A Rogers
(74) Attorney, Agent, or Firm — Canon U.S.A., Inc., IP Division

(57) ABSTRACT

An information apparatus determines whether a number of color pages in a document data has increased, and when it is determined that the number of the color pages has not increased, page reduction processing is executed on specified pages in the document data, and when it is determined that the number of the color pages has increased, page reduction processing is not executed on the specified pages in the document data.

10 Claims, 14 Drawing Sheets

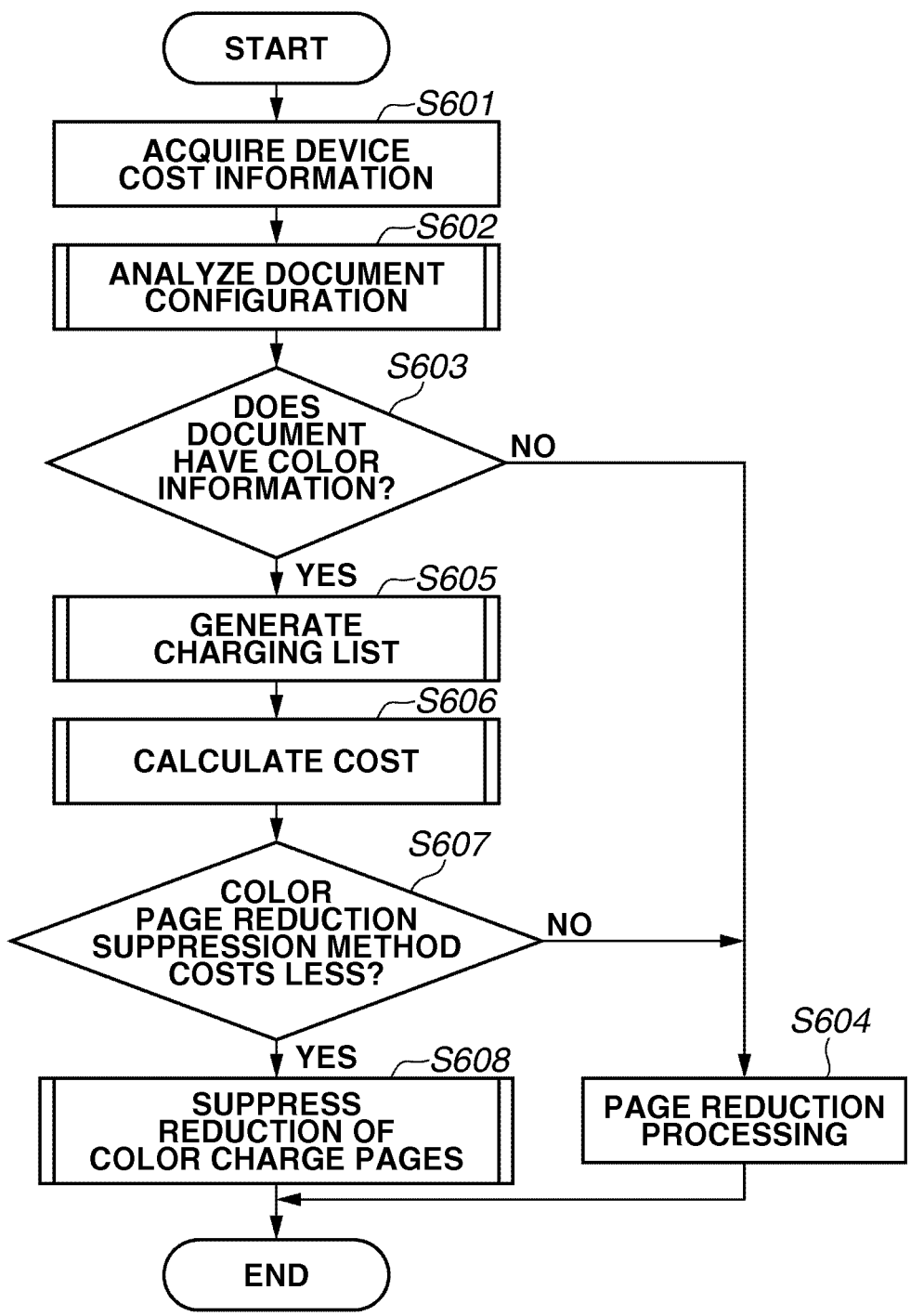

FIG.7A
ORIGINAL DOCUMENT
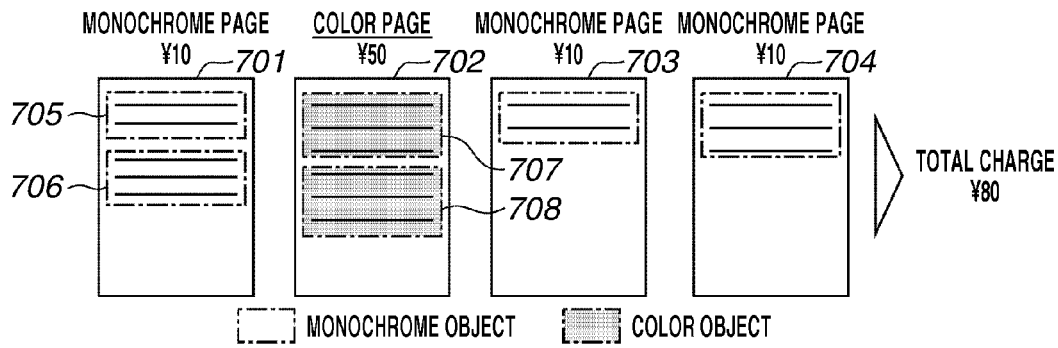
MONOCHROME OBJECT     COLOR OBJECT
FIG.7B
ORDINARY PAGE REDUCTION PROCESSING
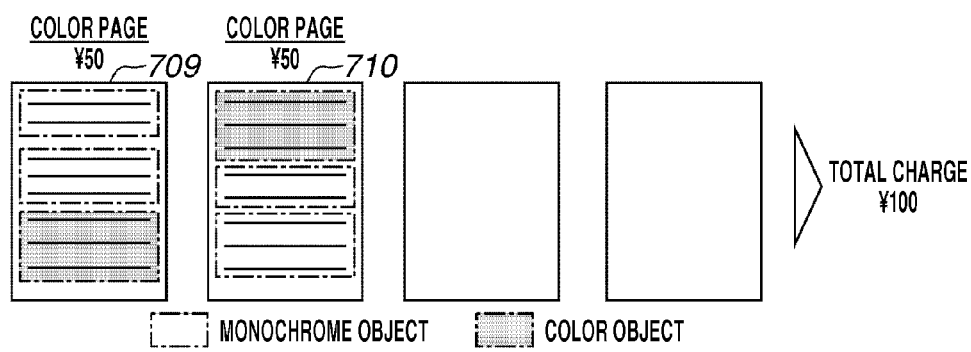
MONOCHROME OBJECT     COLOR OBJECT
FIG.7C
COLOR CHARGE PAGE REDUCTION SUPPRESSION PROCESSING
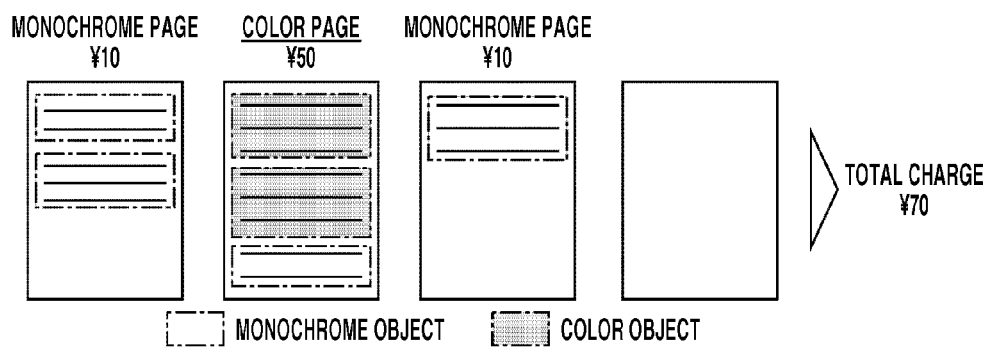
MONOCHROME OBJECT     COLOR OBJECT
EXAMPLE OF COST OF ENVIRONMENT TO BE USED
| COLOR TONER COST | ¥45 |
|---|---|
| MONOCHROME TONER COST | ¥5 |
| PAPER COST | ¥5 |
EXAMPLE OF COST OF PRINT
| COLOR PRINT | MONOCHROME PRINT |
|---|---|
| ¥50 | ¥10 |

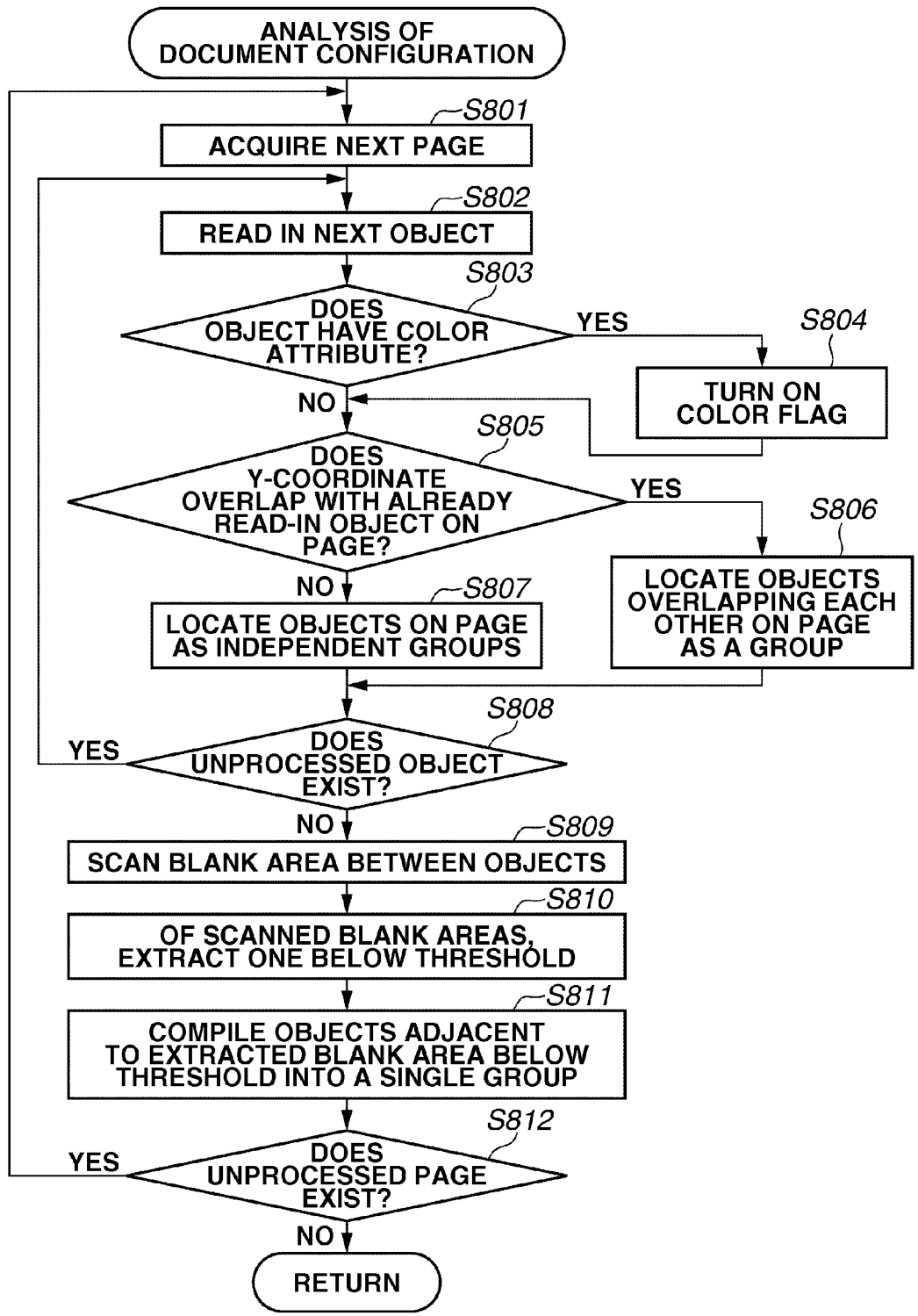

FIG.9
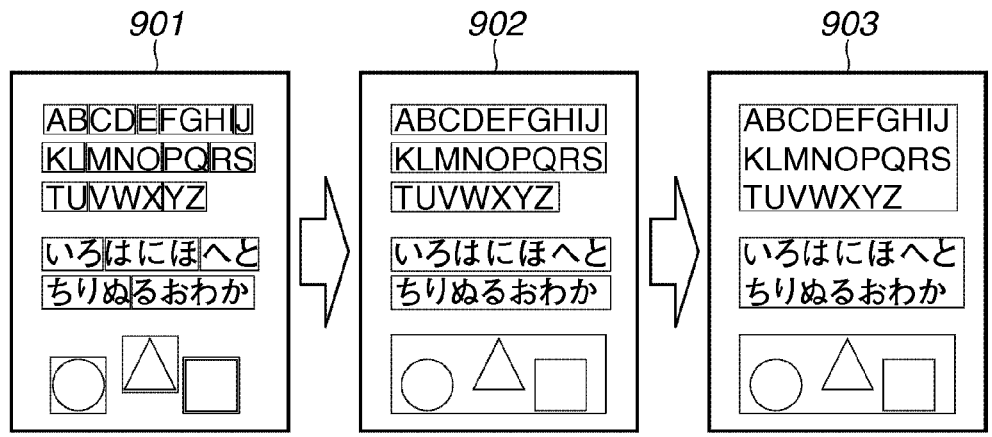
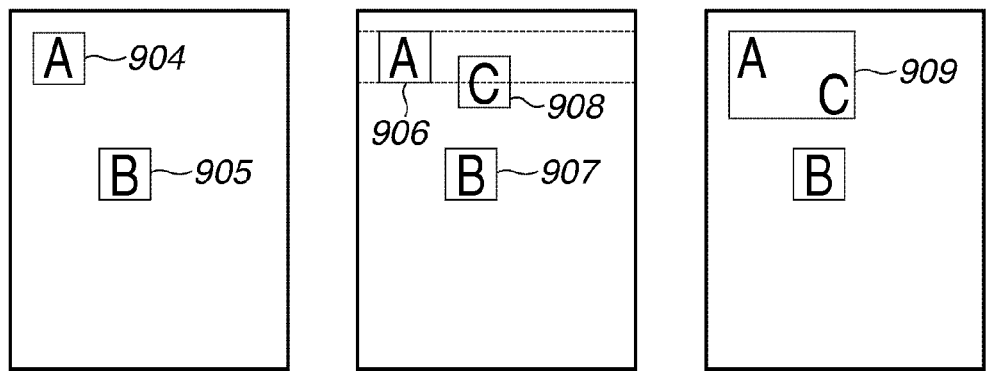
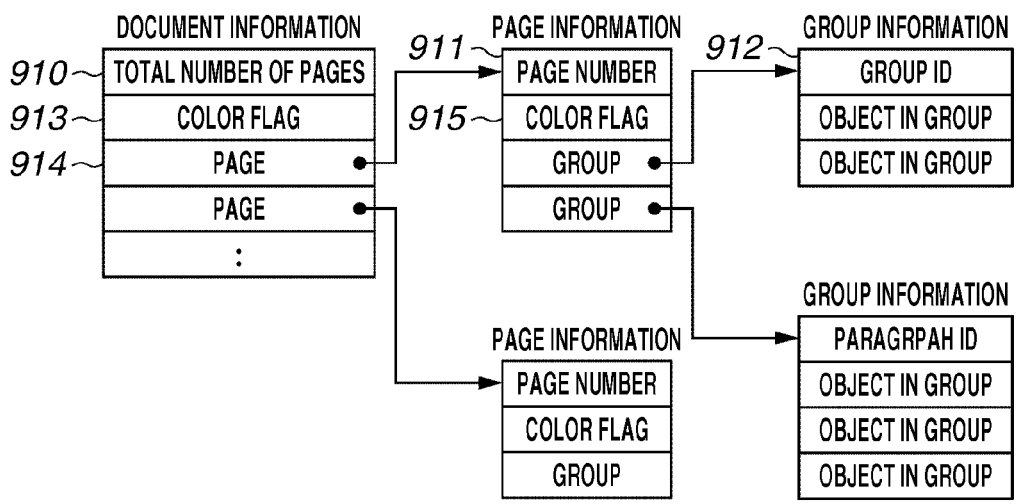

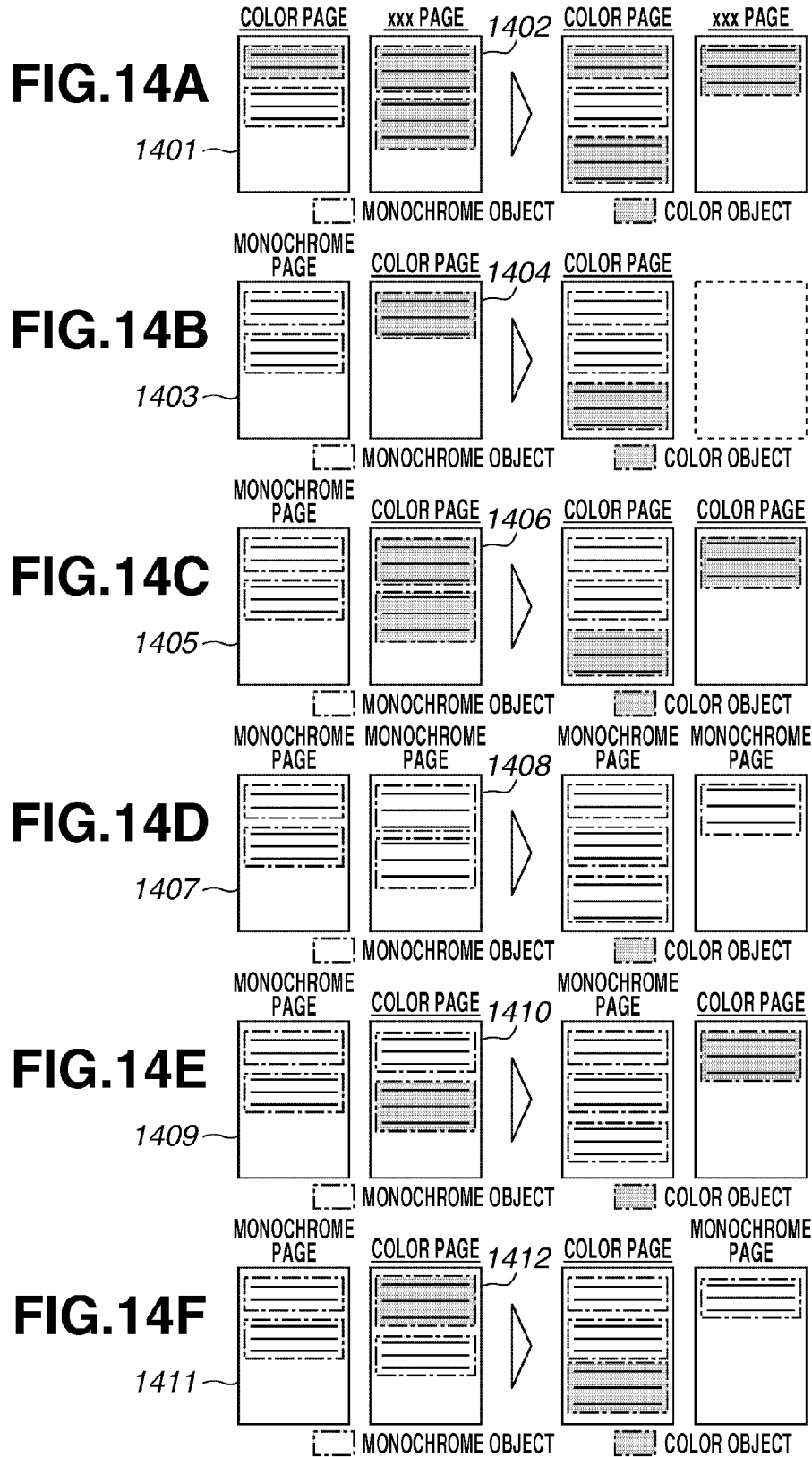

PRINT SAVING PAGE DEDUCTION SUPPRESSION PROCESSING MINIMIZING THE NUMBER OF COLOR PAGES

BACKGROUND OF THE INVENTION

1. Field of the Invention

The present invention relates to an information processing apparatus aiming at reducing print cost, a control method of the same and a storage medium for the same.

2. Description of the Related Art

A technology for saving the number of papers used in printing by reallocating objects contained in a document data is known as print saving processing. The print saving processing is a kind of layout change processing. This layout change processing generates a blank area in a page by bringing movable objects existing in the same page to one side in a single direction of the paper such that they do not overlap with other objects. Then, a movable object existing on a page next to the current page in which the blank area has been just generated is moved into the blank area of the current page without destroying the location order of the objects. Consequently, the moved object is printed on a page preceding the page where it should have originally been printed. By repeating this processing of generating the blank area, it is possible to reduce the number of pages used in printing the document data. Because the print saving processing can save the number of papers used in printing, the print cost can be reduced, thereby achieving a printing operation which takes care of environment issues such as paper usage.

Japanese Patent Application Laid-Open No. 2007-140766 has proposed another technology which addresses print cost. Japanese Patent Application Laid-Open No. 2007-140766 discusses a print data generation method in which, when allocating plural pages to printing papers, its color pages are allocated to a single paper if possible. More specifically, first, as to a target document data page it is determined whether it is a monochrome page or a color page. After the determination, the pages determined to be color pages are allocated collectively to a single print paper. Further, at the time of the allocation, the respective pages are laid out without destroying an order of their pages. As a result, the number of papers used in color printing can be saved.

In the above described print saving processes, the number of papers to be printed in color has not been taken into account. In other words, even if the number of papers can be reduced by generating a blank space in the print saving processing, the number of papers to be printed in color can be increased. Such a problem of conversely increasing the print cost has not been considered.

SUMMARY OF THE INVENTION

One aspect of the present invention is to propose a print saving suppression processing method taking into account the cost of color printing, which is different from the aforementioned ordinary print saving processing of the prior art. An information processing apparatus implementing the print saving suppression processing can offer to a user a print solution which suppresses more print cost.

An information processing apparatus includes an input unit that inputs document data containing plural pages, wherein each of the plural pages includes at least an object, a determination unit that determines, when a page reduction processing of moving the object on a page next to a specific page contained in the document data into a blank area of the specific page is executed on the specified pages contained in the document data, whether a number of color pages in the document data has increased, and a control unit which, when the determination unit determines that the number of the color pages has not increased, executes the page reduction processing on the specified pages, and when the determination unit determines that the number of the color pages has increased, does not execute the page reduction processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a flow chart to be executed by the print cost reduction processing unit of the first exemplary embodiment.

FIGS. 7A, 7B and 7C are diagrams illustrating examples of page reduction results taking into consideration the cost information according to the first exemplary embodiment.

FIG. 8 is a flow chart to be executed by a group generation unit according to the first exemplary embodiment.

FIG. 9 is a diagram illustrating a calculation method for calculating the number of pages which can be printed and a data management method according to the first exemplary embodiment.

FIGS. 14A, 14B, 14C, 14D, 14E and 14F are diagrams each illustrating the patterns of increase/decrease in color page when reducing the number of pages.

DESCRIPTION OF THE EMBODIMENTS

Figure 1:
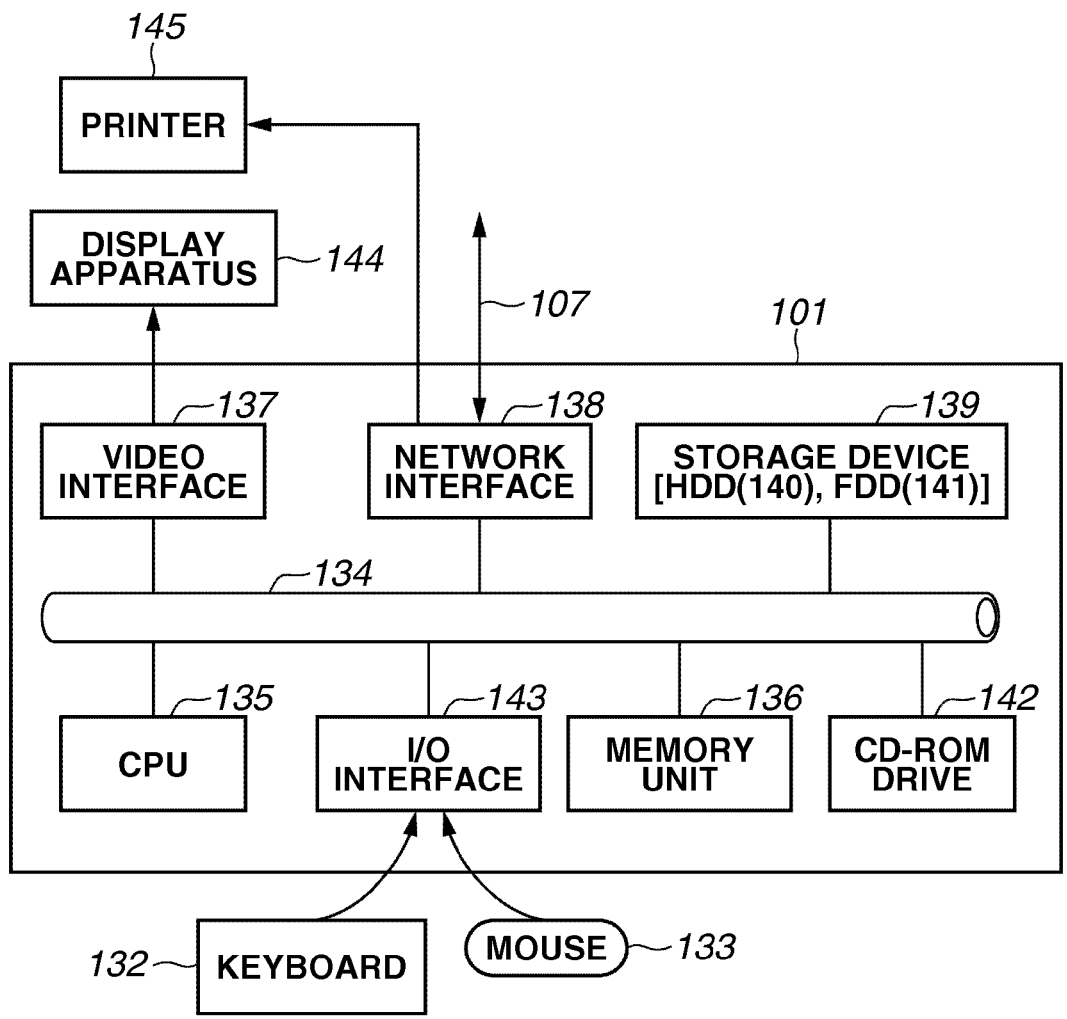
FIG. 1 is a diagram illustrating a system configured to execute a layout processing of a first exemplary embodiment.

Various exemplary embodiments, features, and aspects of the invention will be described in detail below with reference to the drawings.

Technical terms used in respective exemplary embodiments of the present invention will be explained. The document data is generated by a user using a document data editing application function. The data is generated by editing the document data, generating graphics, pasting photographs and the like. The document data is, for example, data used as a reference material for presentation to customers. A user can get a document, e.g., a reference material by printing the document data with a printer. The document data is constituted of a single page or plural pages.

The objects in the document data refer to element data including characters, graphics, and photographs (image data). Those element data, i.e., a collection of the objects means the aforementioned document data. When the object is disposed on a single page or on plural pages, following two patterns can be considered. In any case, the collection of the objects is the document data. The objects are classified largely into two types and are divided into a monochrome object and a color object. The monochrome object refers to element data whose object color data is expressed with binary, white and black, while the color object refers to element data whose object color data is expressed with multiple values. When an automatic determination print which selects monochrome print or color print by determining the type of an object contained in the page is specified at the time of printing, a page containing even one color object is printed in color while a page containing no color object is printed in monochrome.

The object may be single or plural. For example, of plural objects, some objects compiled into a single group can be regarded as an object. On the other hand, character data constituted of a single character is an object. While in the exemplary embodiment of the present invention, grouped objects are referred to as group, the grouped objects may also be referred to just as an object depending on a case. Of course, a single object is also called object. From the above description, it may be understood that the document data is constituted of at least a single object.

The print saving processing refers to moving an object located on a page next to a specific page contained in the document data into a blank area of that specific page. Further, processing of moving an object in a specific page of the document data in a specific direction to generate the blank area in that page is also included in the print saving processing. A specific processing method will be described below. By executing the print saving processing on a specific page, the number of pages used in printing the document data can be reduced. In each exemplary embodiment of the present invention, the print saving processing is also referred to as page reduction processing depending on a case. A software unit configured to achieve the print saving processing is called page reduction processing unit.

Similar to the print saving processing, print saving suppression processing refers to moving an object located on a page next to a specific page in the document data into the blank area in that specific page. A different point from the print saving processing of moving an object if the object on the next page can be included in the blank area is that the print saving suppression processing does not always move the object when the blank area exists. If the number of the color pages in the document data is increased by executing the print saving processing, the print saving suppression processing does not move the object. The reason is that when printing the document data, the number of pages on which color print is implemented is increased, which increases the print cost. A specific processing method of the print saving suppression processing will be described below. In each exemplary embodiment of the present invention, the print saving suppression processing may be referred to as color charge page reduction suppression processing or page reduction suppression processing. A software unit which achieves the print saving suppression processing is referred to as color charge page reduction suppression unit. Hereinafter, the exemplary embodiments for carrying out the present invention will be described with reference to the accompanying drawings.

FIG. 1 illustrates a system configured to execute the page layout processing. A computer module 101 is an information processing apparatus, which is connected to an input device such as a keyboard 132, a pointing device represented by a mouse 133, and an output apparatus such as a display apparatus 144 and a local printer 145. An input/output interface 138 allows the computer 101 to communicate with other computer apparatus via a network connection 107. The network connection 107 is local area network (LAN) or wide area network (WAN).

The computer module 101 includes at least one processor unit (CPU) 135 and a memory unit 136. The memory unit 136 is a semiconductor random access memory (RAM) or read-only memory (ROM). Further, the computer module 101 contains an input/output (I/O) interface such as a video interface 137 and an I/O interface 143 for the keyboard 132 or the mouse 133. A storage device 139 contains a hard disk drive 140 or a floppy disk drive 141. A magnetic tape drive may be used, although not shown in FIG. 1. A CD-ROM drive 142 is provided as a nonvolatile data resource.

Figure 5:
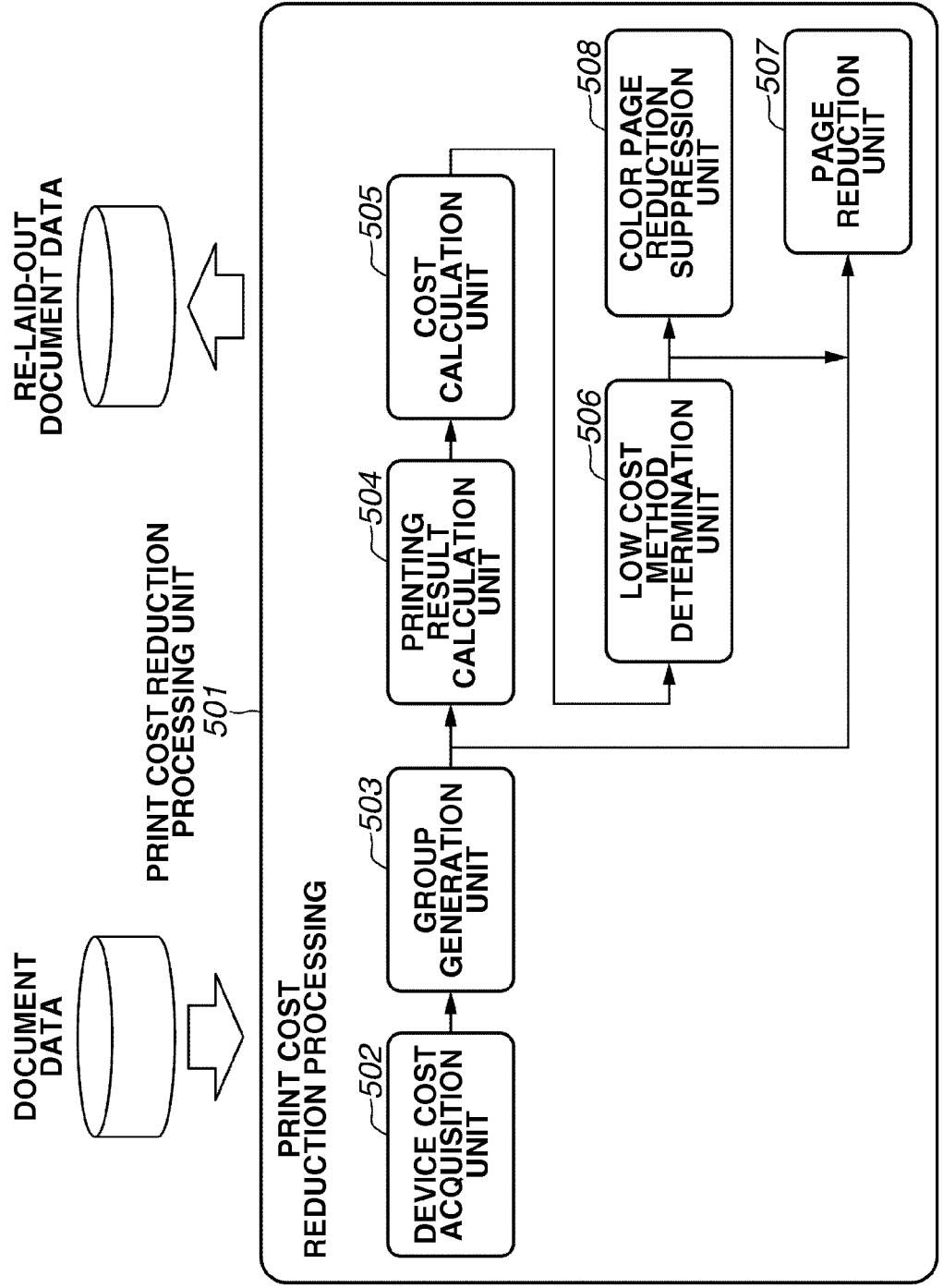
FIG. 5 is a diagram illustrating a print cost reduction processing unit according to the first exemplary embodiment.

The computer module 101 fulfills a function as an information processing apparatus by executing a program for achieving an operating system stored in the HDD 140. Each software configuration illustrated in FIG. 5 is achieved on the operating system serving as an execution environment of the application, and a program for achieving each unit illustrated in FIG. 5 is stored in the HDD 140. The program is loaded on a work area of the memory unit 136 and executed by the CPU 135 so that each unit illustrated in FIG. 5 is achieved. The application software for achieving a certain function is executed on the operating system and this software configuration executes a function of the application software. The software configuration achieves processing illustrated in the flow chart of the present exemplary embodiment which is described below.

Figure 2:
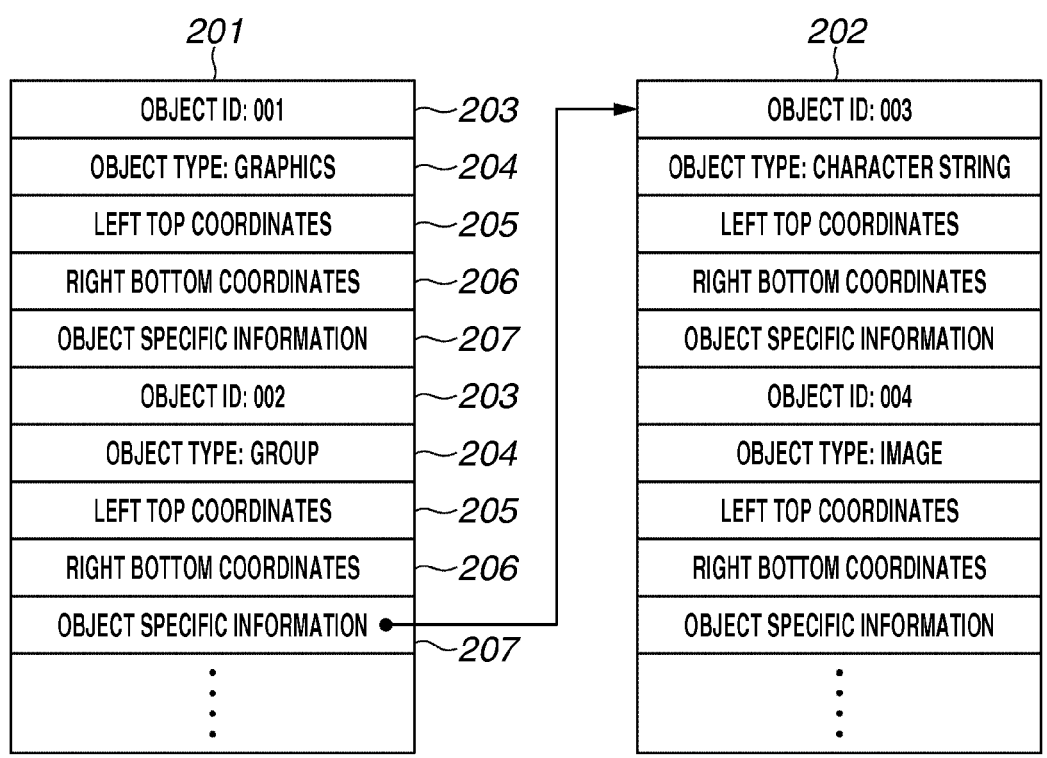
FIG. 2 is a diagram illustrating the configuration of document object information of the first exemplary embodiment.

FIG. 2 illustrates information of an object managed by the software configuration and an object management method of the present exemplary embodiment. An ID 203 for identifying an object, object type 204, coordinates 205 and 206 indicating an object position, and object specific information 207 are allocated to each object. The data indicating the object is structured in a list and each data is stored in the object list 201.

In the case of a graphic object, the object specific information is information about its line size, line type and the like, and in the case of a character object, the object specific information is information about its character format, character size and the like. The content of information is varies depending on the type of the object and each object stores its specific information. If the object types are grouped, information about the grouped object is registered in the specific information 207. Information for linking to the information indicated by the object list 202 is registered in the object specific information 207. Respective object information pieces allocated to each object are registered in the object list 202. Such grouped object information is stored in a hierarchical configuration.

Figure 3:
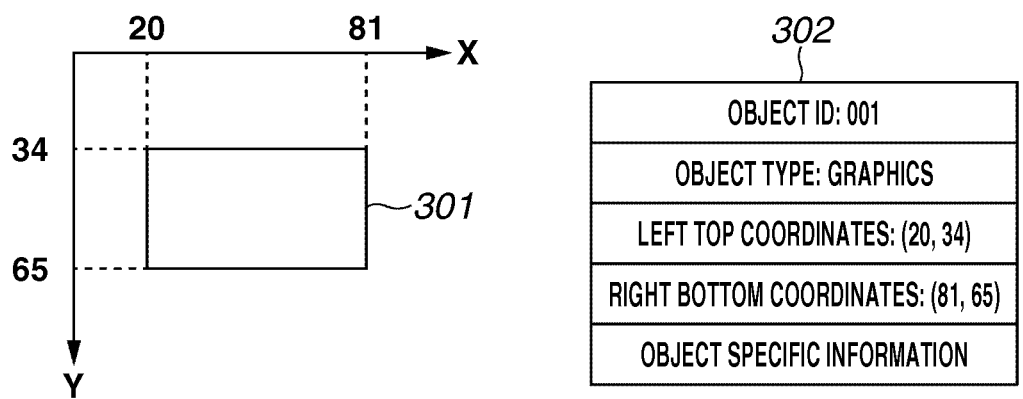
FIG. 3 is a diagram illustrating a specific example of the document object information according to the first exemplary embodiment.
Figure 4:
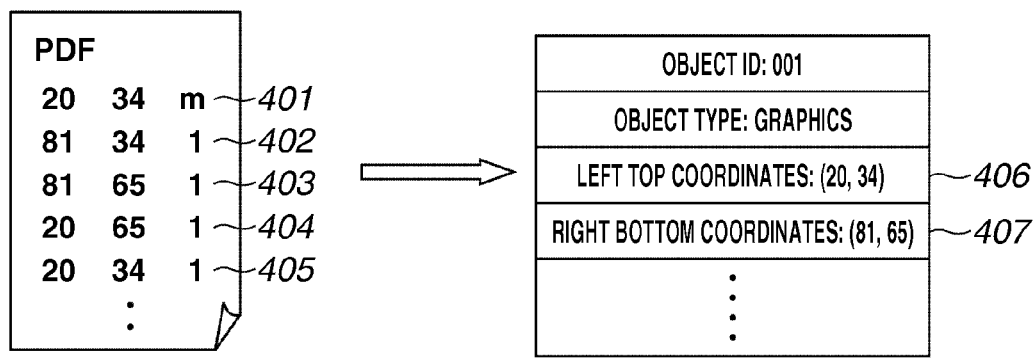
FIG. 4 is a diagram illustrating a specific example of data read out from a PDF format according to the first exemplary embodiment.

FIG. 3 illustrates an example of information stored in the object list 201. A graphic object 301 disposed on coordinates illustrated in FIG. 3 is registered in a memory with a content illustrated in the list 302 of FIG. 3. The data configuration of the document data which the present exemplary embodiment handles is a portable document format (PDF). FIG. 4 is a diagram indicating an example in which the same graphic object is read in from the PDF document and extracted as the information of that object. In this PDF format, a graphic element is represented by connecting a starting point 401 (20, 34), a point 402 (81, 34), a point 403 (81, 65), a point 404 (20, 65), a point 405 (20, 34). From this representation, a rectangular object having left top coordinates 406 (20, 34) and right bottom coordinates 407 (81, 65) is generated.

FIG. 5 is a diagram illustrating an outline of print cost reduction processing of the present exemplary embodiment. The document data is stored in the HDD 140, and when starting the print cost reduction processing, the document data is input to the print cost reduction processing unit. A device cost acquisition unit 502 acquires cost information including print cost when executing monochrome print and color print and cost of printing papers used in printing. The cost information is information acquired from a printer connected to the computer module 102, which is an information processing apparatus, and specific cost information is allocated to each connected printer. The specific cost information may be the same depending on the printer type.

A group generation unit 503 brings together neighboring objects into a group. A printing result calculation unit 504 executes various processing for listing the results when executing the page reduction procedure. A cost reduction unit 505 executes processing for calculating print cost from the result list. A low cost method determination unit 506 selects a page reduction method in which the print cost is further suppressed based on the calculated print cost. The page reduction method of the present exemplary embodiment includes two types of processing, that is, the page reduction processing and the page reduction suppression processing. The page reduction unit 507 executes page reduction processing and the color charge page reduction suppression unit 508 executes page reduction suppression processing. The document data that is laid out again by any page reduction processing is stored in the HDD 140.

FIG. 6 is a flow chart illustrating processing of a print cost reduction processing unit 501. The document data processed by the print cost reduction processing unit 501 in the present exemplary embodiment is as illustrated in FIG. 7. Pages contained in the document data illustrated in FIG. 7 include monochrome objects (e.g., 705, 706) and/or color objects (e.g., 707, 708).

In step S601, the device cost acquisition unit 502 acquires cost information used in printing the document. The acquired cost information is acquired in a format illustrated in a table 711. If the cost information is information as illustrated in the table 711, cost for printing a specific page in the document data in color is color toner cost of 45 yen plus paper cost of 5 yen, totaling 50 yen. Cost for printing the specific page of the document data in monochrome is monochrome toner cost of 5 yen plus paper cost of 5 yen, totaling 10 yen. Generally, color print consumes plural recording materials (e.g., toner, ink) in a large amount compared to monochrome print, thereby increasing the print cost. However, the print cost of the monochrome print may become higher than the color print depending on the recording medium, i.e., printing paper cost. Thus, in the present exemplary embodiment, the page reduction suppression processing, which takes into consideration the cost on the recording medium as well as the cost on the recording material, has been proposed.

In step S602, the group generation unit 503 compiles neighboring objects on each page of a document into a group. More specifically, as illustrated in a group information list 912 illustrated in FIG. 9, processing of adding an object ID as a group object is executed. By executing this processing, groups 705, 706 can be generated from character objects or graphic objects of each line existing on a page 701.

In step S603, by referring to a color flag in the information list of the document, the printing result calculation unit 504 determines whether the document has color information. More specifically, whether any color object exists in the document data is determined. A detail of the information list of the document is described below.

In step S603, when it is determined that the document has no color information, the processing proceeds to step S604, where the page reduction processing is executed. For description purposes of how the page configuration changes when the page reduction processing is executed on a specific page, two pages 701, 702 will be described as example. Although the color objects exist on page 702, it is not taken into account that the page 702 has the color information because the page reduction processing method will be described this time. First, the page 701 is specified as a given page in the document data input. After specifying the page 701, the printing result calculation unit 504 moves a group 707 under the groups 705, 706. If there is no sufficient blank area for a paragraph 707 to come under the group 706, the printing result calculation unit 504 generates a blank area by compressing the blank area from the top of the page up to the group 705 and the blank area between the group 705 and the group 706. The printing result calculation unit 504 moves the group 707 into that blank area. Unless the group 707 can be accommodated in the blank area even if the blank area is generated, the printing result calculation unit 504 does not move the group 707. If the group 707 is moved to the page ahead, the printing result calculation unit 504 moves all groups in the page 702, i.e., the group 708 in this case, into a blank area generated in the page 702.

By repeatedly executing the above-described operation on all the pages of the document data, an effect of reducing a content A including pages 701 to 704 in FIG. 7 to a content B including two pages, 709, 710 is obtained. This page reduction processing enables the number of printing papers to be reduced so that it appears as if the print cost has been reduced. However, the case of the pages 709, 710 includes printing of two pages in color, thereby increasing an entire print cost higher than the case of A by 10 yen. Because, conventionally, the color print cost was not taken into consideration in the page reduction processing, the print is executed at a higher print cost. A problem which the conventional page reduction processing embraces has been described above.

In step S603, when it is determined that the document has color information, in step S605, the printing result calculation unit 504 generates a charge list which provides both a print cost in the ordinary page reduction processing and a print cost in the color charge page reduction suppression processing. The charge list is a list containing information about how many color pages and monochrome pages are contained in B and C of FIG. 7 as a result of each page reduction processing. The detail of this list and a generation method is described below. In step S606, the cost calculation unit 505 calculates the print costs of the page reduction processing and the color charge page reduction suppression processing based on the charge list. In step S607, the low cost method determination unit 506 determines which processing can execute the lower cost printing based on a calculated result.

In the case of the document data in FIG. 7, B costs less than C, thus, the processing proceeds to the color charge page reduction suppression processing of step S608. Presuming that when the printing paper cost 712 is 35 yen or more, the color print cost is 80 yen and the monochrome print cost is 40 yen. In this case, the cost of B is 160 yen (80 yen×2) and the cost of C is 160 yen (40 yen×2+80 yen) and consequently, the processing proceeds to ordinary page reduction processing of step S604. The reason for this processing is that if the print cost is the same, the document can be handled more easily if it is printed with a smaller number of pages. If the number of the pages increases, the document size thickens, such that it takes more time to search for a content which a user wants to see and a required storage place needs to be larger. Thus, according to the present exemplary embodiment, when the print cost required for the ordinary page reduction processing is equal to the print cost required to execute the color charge page reduction suppression processing, the ordinary page reduction processing is executed to reduce the number of the printing papers. Through such a series of the processing, the number of print pages can be reduced as much as possible while the print cost is suppressed.

FIG. 8 is a flow chart illustrating an analysis processing of the document configuration by the group generation unit 503. The analysis of the document configuration refers to an operation of compiling objects within the page into a group and generating the group information list 912 in the document information list 910. To explain the analysis processing of the document configuration in detail, the analysis processing on the document data illustrated in FIG. 9 will be described. In a page 901 of FIG. 9, words in the document exist as an independent object. The analysis processing of the document configuration will be described based on the page 901 of FIG. 9.

In step S801, the group generation unit 503 acquires pages of an input document data sequentially from its head page. In step S802, the group generation unit 503 reads an object at the head of unprocessed objects. At this time, to determine whether the read-in object is a color object, whether the object has a color attribute is determined. If it is determined that color information is present, in step S804, the group generation unit 503 turns on a color flag 915 of a page information list 911 for a page in which the object exists and a color flag 913 of the document information list 910.

In step S805, the group generation unit 503 determines whether a read-in object overlaps with the Y coordinate of already read-in objects. For example, if the read-in object is 905, it does not overlap with an already read-in object 904 on the Y-axis. Thus, in step S807, the two objects are regarded as different groups and placed on the page. In step S806, if the read-in object is 908, the object 908 overlaps with the object 906 on the Y-axis and consequently, the two objects overlapping each other on the Y-axis are compiled into a group 909 and the compiled group 909 is placed on the page.

If the object 906 on the page belongs to the same group as the object 908, the group generation unit 503 adds the object 908 to the group information list 912. If the read-in object 908 overlaps with both the objects 906, 907 on the page, for example, the group generation unit 503 registers all the overlapping objects in the group information list 912.

In step S808, the group generation unit 503 determines whether any unprocessed object exists in the page. If an unprocessed object exists, the processing returns to step S802, where the group generation unit 503 acquires the next unprocessed object. By repeating this processing, the page 901 containing plural independent objects can be compiled into a configuration like a page 902 containing respective compiled lines.

After all the objects are processed, the processing proceeds to step S809, where the group generation unit 503 scans a blank area between the objects located on the page. In step S810, the group generation unit 503 extracts, from among the scanned blank areas, a blank area having a scanned value below a specified threshold. In step S811, the group generation unit 503 compiles objects adjacent to the extracted blank area having the value below the threshold into a group. More specifically, the group generation unit 503 extracts objects in the group adjacent to the blank area from the group information list 912 and generates the group information list 912 with the extracted objects. Consequently, a group like a page 903 can be generated. As illustrated in the page 903, for example, objects of the same type or object having a specific relationship can be compiled into a single object. As a result, even if the objects are moved by the page reduction processing, objects having a specific relationship are never separated from each other. In step S812, the group generation unit 503 determines whether any unprocessed page exists, and when all the pages are processed, terminates this flow.

Figure 10:
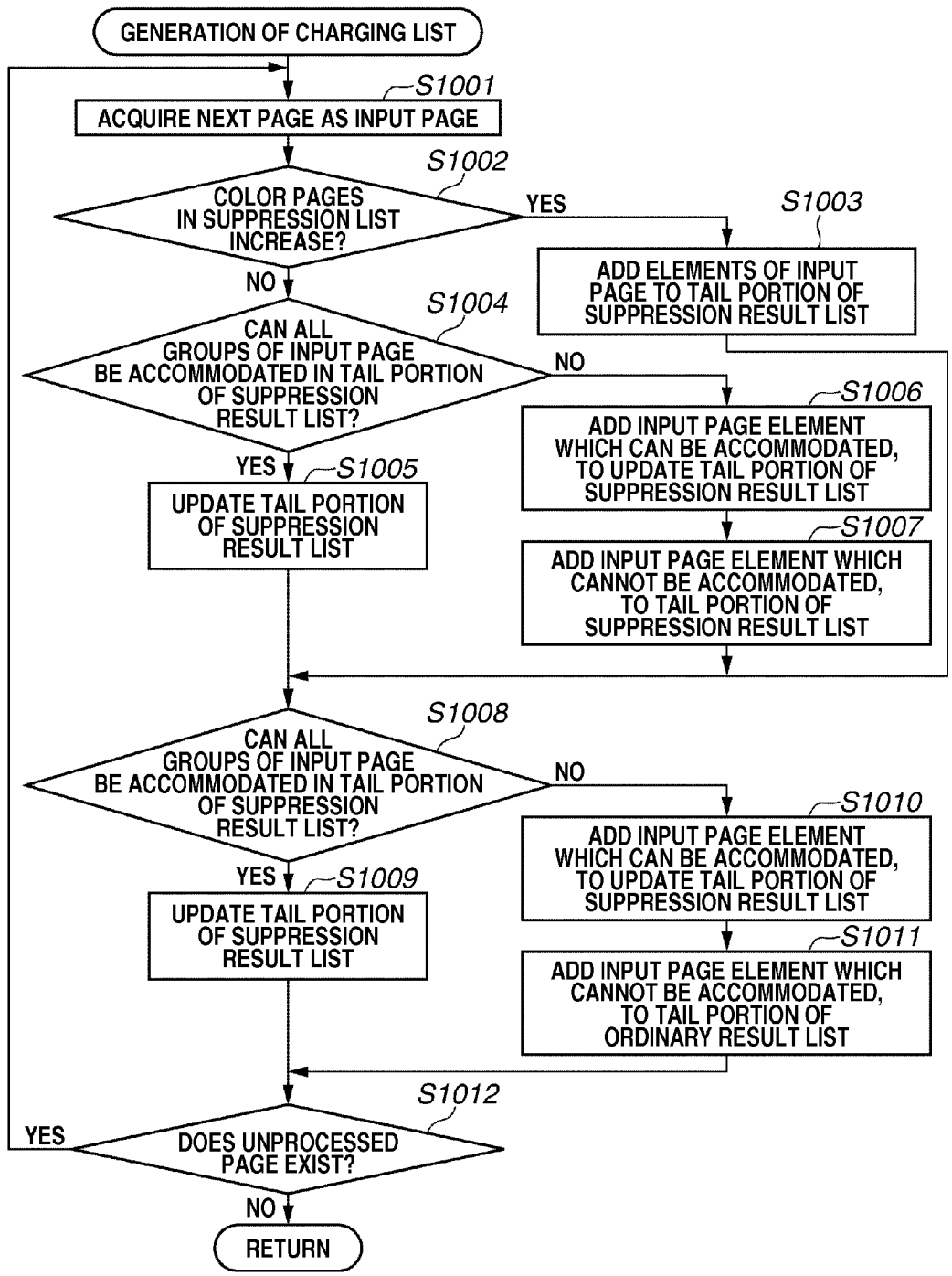
FIG. 10 is a flow chart to be executed by a printing result calculation unit according to the first exemplary embodiment.
Figure 11:
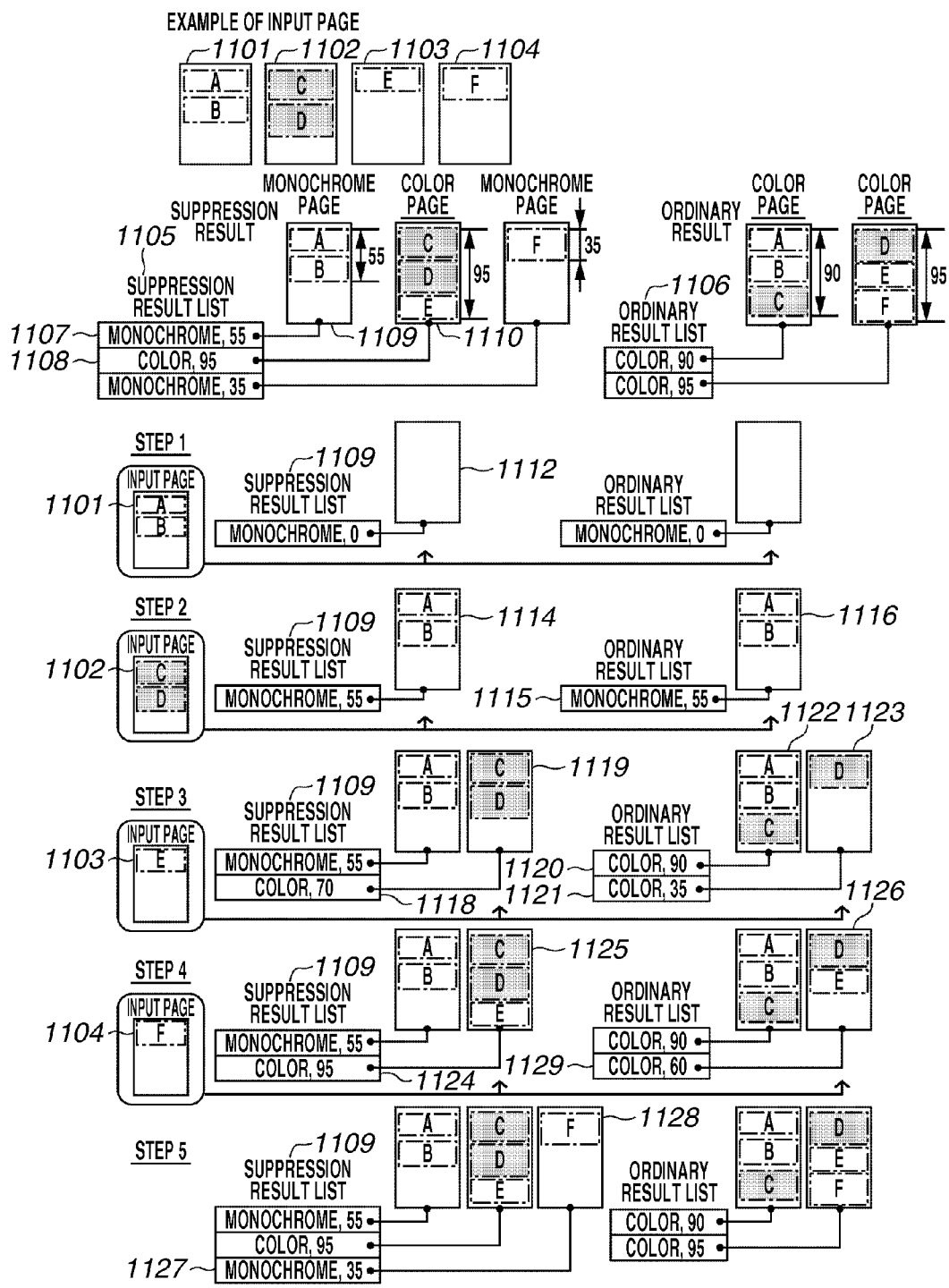
FIG. 11 is a diagram illustrating an example of a charge list of each page reduction unit according to the first exemplary embodiment.

FIG. 10 is a flow chart illustrating a generation method of the charge list to be executed by the printing result calculation unit 504. The processing of FIG. 10 will be described with reference to the document data of FIG. 11. The charge list refers to a list describing a print cost in a case where the page reduction processing is executed on all the pages 1101 to 1104 and a print cost in a case where the page reduction suppression processing is executed on all those pages, as illustrated in lists 1105, 1106. The content of the charge list will be described using a suppressing result list 1105 as an example. Color information (information indicating monochrome or color) of each page and a total length in the Y-axis direction of all the groups in the page are stored in the list. An element 1107 in the list indicates a monochrome page 1109 in which the group length is 55 and an element 1108 indicates a color page 1110 in which the group length is 95.

The process of FIG. 10 handles processing for generating the suppressing result list 1105 in steps S1002 to S1007 and processing for generating the ordinary version result list 1106 in steps S1008 to S1011. Steps S1008 to S1011 are different from steps S1004 to S1007 in that the former generates the ordinary version result list 1105 while the latter generates the suppressing result list 1106. However, because their processing method is equal, a description of steps S1004 to S1007 is omitted.

In step S1001, the printing result calculation unit 504 acquires a next page as an input page from the document information list 910. At an initial condition, the suppressing result list indicates a blank page 1112 and is in the same status as the suppressing result list 1109 of step 1. In step S1002, the printing result calculation unit 504 determines whether the number of color pages in the suppressing result list is increased. In other words, this procedure determines whether the number of pages that should be printed in color is increased when an object on a page next to the input page is located in a blank area generated by executing the page reduction processing onto the input page.

For example, when, in a state of a page 1114, the ordinary page reduction procedure is performed on an input page 1102, groups C, D containing color information are placed on both two pages like pages 1122, 1123. This state is considered as a case in which the number of the color pages in the suppressing list is increased. When the number of the color pages is increased, the processing proceeds to step S1003. In step S1003, the printing result calculation unit 504 adds information about the color and height of the input page 1102 to an end of the suppressing result list 1109 of step 2 to generate a suppressing result list 1109 of step 3. More specifically, the printing result calculation unit 504 adds the information to the tail portion without updating the content of the tail portion of the suppressing list.

In step S1004, the printing result calculation unit 504 determines whether all the groups of the input page 1103 can be accommodated in the tail portion of the suppressing result list 1109 of step 3. When all the groups can be accommodated in the tail portion, in step S1005, the printing result calculation unit 504 updates a tail portion 1118 of the list, as illustrated in 1124. In this case, although the color information is not changed, the length is updated so that the length of the groups C and D (70) is changed to the length of the groups C, D and E (95). An example in which all the groups in the input page cannot be accommodated in the tail portion of the list will be described by taking a case of inputting the input page 1102 into a page 1116 as an example. In step S1006, the printing result calculation unit 504 adds an element which can be accommodated in a page 1116, i.e., the color information and the length of the group C in the page 1102 to update a tail portion 1115 of the list as illustrated in 1120. In step S1007, the printing result calculation unit 504 adds an element of the input page which could not be accommodated, i.e., the color information and the length of the group D to the list 1120 as a list end 1121. Finally in step S1012, the printing result calculation unit 504 determines whether any unprocessed page exists and when the processing on all pages ends, terminates the flow of the processing.

In the processing of FIG. 10, the printing result calculation unit 504 virtually executes the page reduction processing and the page reduction suppression processing, but does not actually move any object in the document data. Although the virtual page reduction processing is executed by the printing result calculation unit 504, the virtual page reduction processing may be executed by another processing unit. If a backup of the document data is secured, executing the page reduction processing virtually is not needed. When generating the charge list for the page reduction processing and the page reduction suppression processing, the method of how to execute each processing with which processing unit may be changed within a technical range of those skilled in the art.

Figure 12:
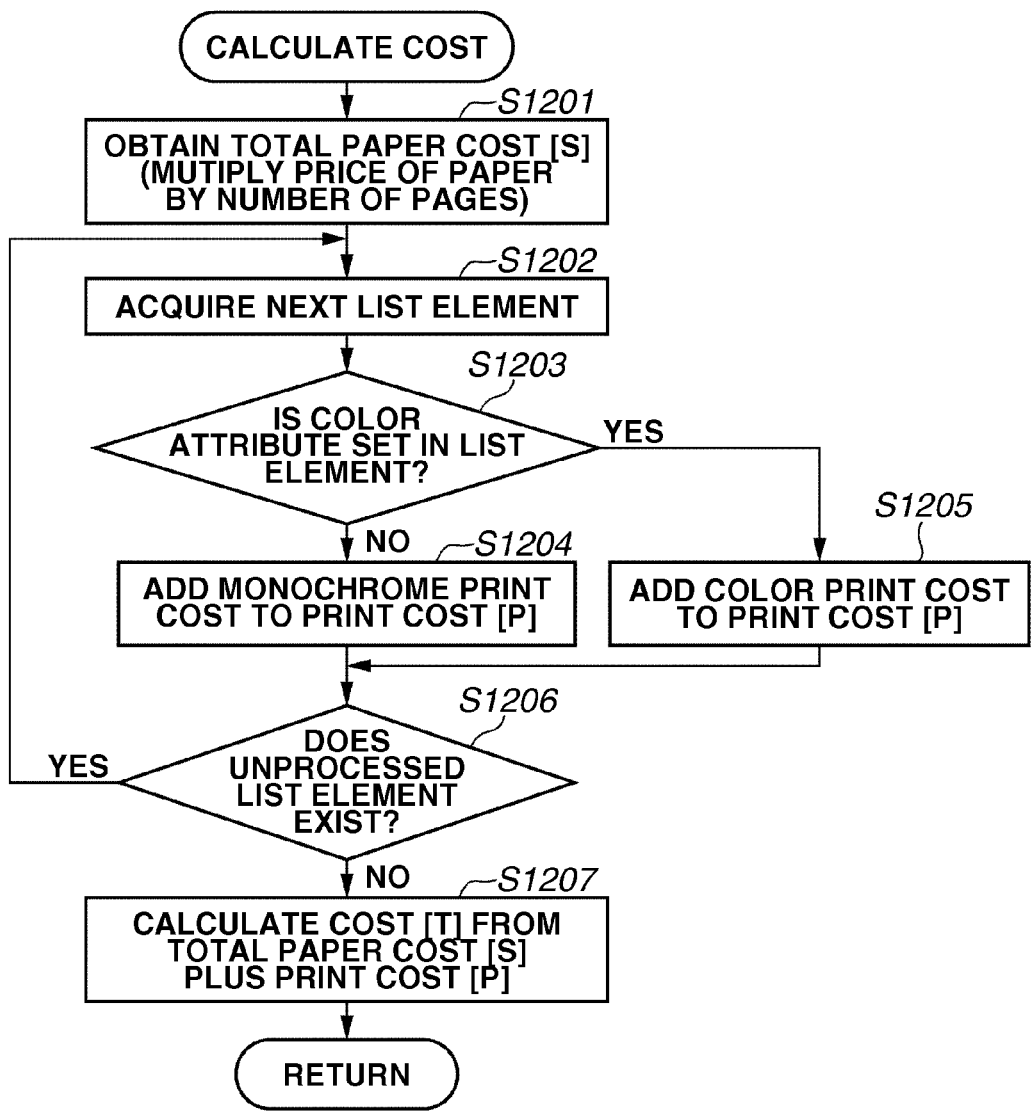
FIG. 12 is a flow chart to be executed by a cost calculation unit according to the first exemplary embodiment.

FIG. 12 is a flow chart for the cost calculation processing to be executed by the cost calculation unit 505. The cost calculation processing will be described with reference to a cost table 711 of FIG. 7 and the suppressing result list 1105. In step S1201, the cost calculation unit 505 calculates a total number of pages from the above-mentioned charge list and multiplies the total number of the pages by a paper price to calculate a total price [S] of papers. Because the length of the suppressing result list 1105 is 3, the total paper cost [S] is 15 yen according to the paper cost 712. In step S1202, the cost calculation unit 505 acquires the next list elements. For example, if the element 1107 in the suppressing result list 1105 has been already input, a next element 1108 is read in. In step S1203, the cost calculation unit 505 determines whether a color attribute has been set as a list element. Because monochrome is set as the element 1107 of the suppressing result list 1105, the processing proceeds to step S1204 and the cost calculation unit 505 adds the cost of 5 yen of the monochrome toner to the print cost [P]. Because color is set in the element 1108, the processing proceeds to step S1205, in which the cost calculation unit 505 adds the cost of 45 yen of color toner to the print cost [P].

In step S1206, the cost calculation unit 505 determines whether any unprocessed list element exists, that is, whether up to the tail portion of the list has been processed. When all the elements are processed, the processing proceeds to step S1207, in which the cost calculation unit 505 calculates a cost from a sum of the total paper cost [S] and the print cost [P]. In case of the suppressing result list of step 5 illustrated in FIG. 11, the print cost [P] is 55 yen, which is obtained by adding a toner cost of 45 yen for a color page to toner cost of 10 yen for two monochrome pages. A total of 70 yen which is obtained by adding a total paper cost [S] of 15 yen to the print cost [P] is a print cost of the document data illustrated in 1128.

Figure 13:
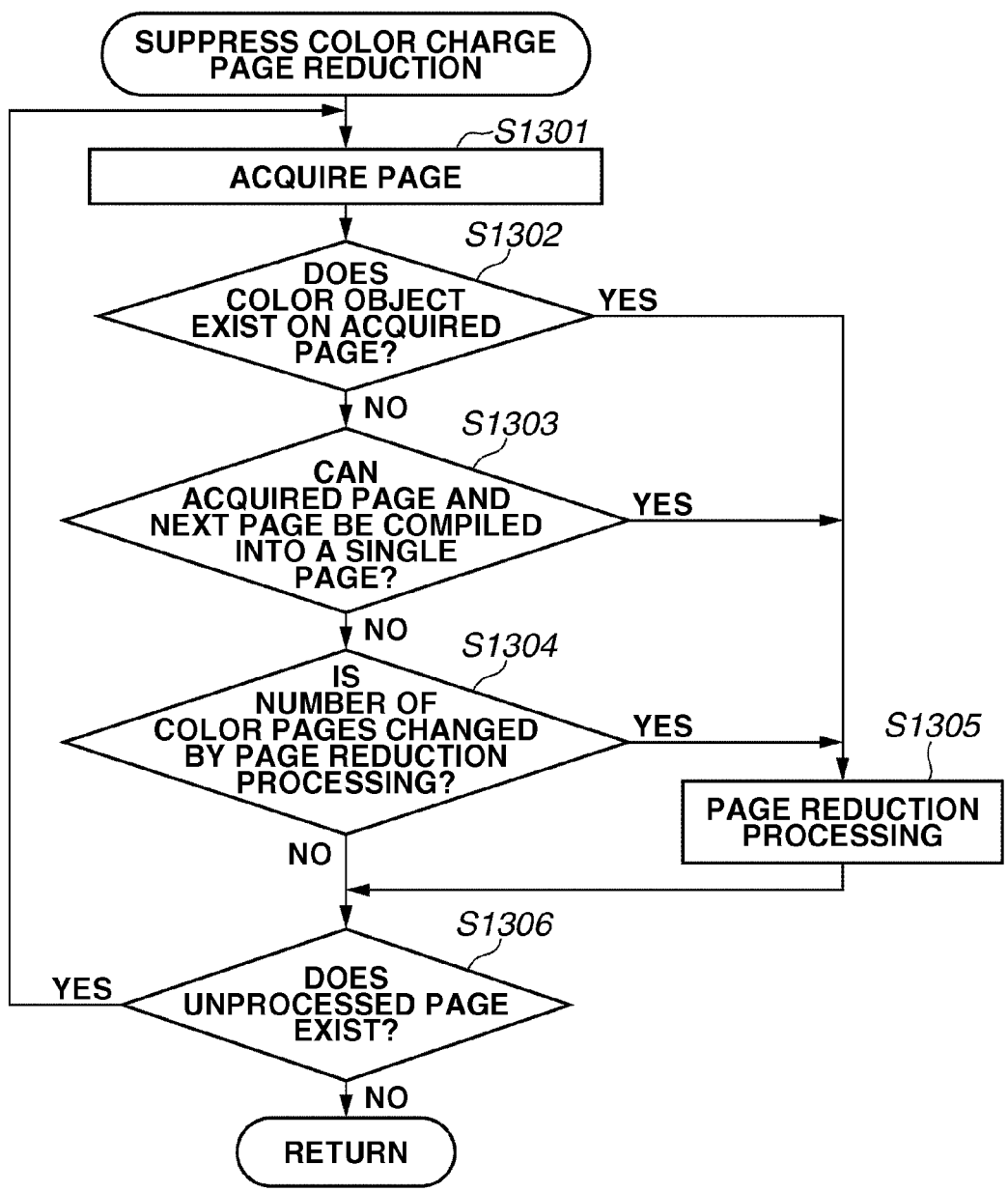
FIG. 13 is a flowchart to be executed by a color charge page reduction suppression unit according to the first exemplary embodiment.

FIG. 13 is a flow chart for the color charge page reduction suppression processing executed by the color charge page reduction suppression unit 508. The color charge page reduction suppression processing will be described with reference to the document data of FIGS. 14A-14F. First, in step S1301, the color charge page reduction suppression unit 508 acquires unprocessed pages in the document data successively from its head of the document data. If an acquired page is a blank page, the color charge page reduction suppression unit 508 deletes the blank page from the document data and acquires a page next to the deleted page. Next, in step S1302, the color charge page reduction suppression unit 508 determines whether any color object exists in the acquired page. In other words, whether the acquired page is a color page or a monochrome page is determined. Determination processing to be executed in steps S1302 to S1304 is processing for suppressing an increase in color page when the page reduction processing is executed to the acquired page and the page next to the acquired page.

A page 1401 of FIG. 14A indicates a color page. For example, in step S1302, if a page acquired by the color charge page reduction suppression unit 508 is page 1401, the number of color pages in the document data is never increased, regardless of whether the object contained in a next page 1402 is in color. In this case, the processing proceeds to the page reduction processing of step S1305.

In step S1303, when moving an object of a next page into the blank area of the acquired page, the color charge page reduction suppression unit 508 determines whether the object can be accommodated in a page. If a page 1403 of FIG. 14 is the acquired page, whether the object on a page 1404 can be accommodated in the blank area of the page 1403 is determined. In case of FIG. 14B, a group comprised of the acquired page 1403 and the next page 1404 can be accommodated in a single page, thereby making it possible to reduce the number of pages. Even if in case of B, the group of the page 1404 is of color and the page 1403 is changed from a monochrome page to a color page, the page reduction processing is executed, thereby leading to a reduction of the print cost. When it is determined that all the elements can be accommodated in a page, the processing proceeds to the page reduction processing of step S1305.

In step S1304, if the page reduction processing is executed on a specific page contained in the input document data, the color charge page reduction suppression unit 508 determines whether the number of color pages in the document data has increased. When it is determined that the number of the color pages has increased, the processing proceeds to step S1305. Otherwise, the page reduction processing is executed on the acquired page. This determination processing will be described based on patterns C to F of FIG. 14.

In case of FIG. 14C, when the page reduction processing is executed on an acquired page 1405 and a next page 1406, the number of color pages is increased. Thus, the processing does not proceed to the page reduction processing of step S1305. When it is determined that the number of the color pages has increased in step S1304, the color charge page reduction suppression unit 508 processes a page next to the specific page to execute any determination of steps S1302 to S1304 without executing any page reduction processing on the specific page. In any determination processing, a determination is made to suppress an increase in the number of the color pages. Although, in the present exemplary embodiment, both the determinations of steps S1302 and S1303 are executed prior to step S1304, a configuration for executing only the determination of step S1304 without making both the determinations is permitted.

In case of FIG. 14D, both an acquired page 1407 and a next page 1408 are monochrome pages, thus, a number of color pages is not increased. Therefore, the processing proceeds to the page reduction processing of step S1305. In case of FIG. 14E, although a page 1410 next to an acquired page 1409 has color attribute, the number of the color pages is not increased because the group having the color attribute is not moved. Thus, the processing proceeds to the page reduction processing of step S1305. In case of FIG. 14F, although a color group is moved to an acquired page 1411, the number of the color pages in the document data is never changed because the color group disappears from the next page 1412. Thus, the processing proceeds to the page reduction processing of step S1305.

In step S1305, the page reduction processing is executed between arbitrary pages in the document data and consequently, an effect as illustrated in FIG. 14A is obtained. In case of FIG. 14A, the page reduction processing is executed on two pages, i.e., an acquired page and a next page. If an object of the next page can be accommodated in the blank area of the acquired page, whether an object on a third page from the acquired page can be moved into the blank area of the acquired page is determined. If it is determined that the object can be moved, the object on the third page is moved to the acquired page. In step S1306, whether any unprocessed page is left is determined and if any unprocessed page is left, the processing proceeds to step S1301 for acquiring a next page. Unless any unprocessed page is left, the flow ends. If, when the third page has been moved to the acquired page as described above, the object of the third page can be accommodated therein, the unprocessed page is a fourth page. If the object on the third page cannot be accommodated therein, the unprocessed page is the third page.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-058103 filed Mar. 16, 2011, which is hereby incorporated by reference herein in its entirety.

What is claimed is:

1. An information processing apparatus comprising:
an input unit configured to input document data containing plural pages, wherein each of the plural pages includes at least an object;
a determination unit configured to determine, when page reduction processing of moving an object on a page next to a specific page contained in the document data into a blank area of a specific page is executed on specified pages contained in the document data, whether a number of color pages in the document data has increased; and
a control unit configured to, when the determination unit determines that the number of the color pages has not increased, execute the page reduction processing on the specified pages, and when the determination unit determines that the number of the color pages has increased, not execute the page reduction processing;
wherein the input unit, the determination unit, and the control unit are embodied by CPU(s) of the information processing apparatus.

2. The information processing apparatus according to claim 1,
wherein the determination unit is further configured to determine whether the page is a color page and whether the object on the next page can be accommodated in the blank area of the page, and,
wherein when it is determined that the specified pages are color pages and that all the objects on the next page cannot be accommodated in the blank area of the specified pages, the determination unit further determines whether the number of the color pages has increased, and, when otherwise determined, executes the page reduction processing on the specified pages regardless of whether the number of the color pages has increased.

3. The information processing apparatus according to claim 1, wherein the page reduction processing includes generating the blank area by moving the object on the specific page contained in the document data in a specific direction and the object on the page next to the specific page is moved into the generated blank area.

4. The information processing apparatus according to claim 1, the information processing apparatus further comprising:
a calculation unit configured to calculate a print cost when executing the page reduction processing on all the pages contained in the document data and a print cost when executing a page reduction suppression processing on all the pages contained in the document data; and
a determination unit configured to determine which print cost is lower based on the print costs calculated by the calculation unit,
wherein, when it is determined that the print cost when executing the page reduction processing is lower, the page reduction processing is executed on all the pages contained in the document data, and when it is determined that the print cost when executing the page reduction suppression processing is lower, the page reduction suppression processing is executed on all the pages contained in the document data;
wherein the input unit, the calculation unit, and the determination unit are embodied by CPU(s) of the information processing apparatus.

5. The information processing apparatus according to claim 4 further comprising a generation unit configured to generate two charge lists which list the print cost of each page contained in the document data based on cost information including print cost of monochrome print, print cost of color print, and costs of printing paper for a case where the page reduction processing is executed on all the pages contained in the document data and for a case where the page reduction suppression processing is executed on all the pages contained in the document data, and
wherein the calculation unit calculates the print cost based on each of the two charge lists, wherein the generation unit is embodied by CPU(s).

6. The information processing apparatus according to claim 4, wherein when it is determined that the two print costs are equal, the page reduction processing is executed on all pages contained in the document data.

7. The information processing apparatus according to claim 4 further comprising an acquisition unit configured to acquire cost information of a printer connected to the information processing apparatus that is specific to the printer.

8. The information processing apparatus according to claim 1, wherein the plural pages comprise monochrome pages including only monochrome objects and/or color pages including at least a color object.

9. A control method for controlling an information processing apparatus, the method comprising:
   inputting document data containing plural pages, wherein each of the plural pages includes at least an object; and
   determining, when page reduction processing of moving an object next to a specific page into a blank area of the specific page contained in document data is executed on specified pages contained in the document data input by the input unit, whether a number of color pages in the document data has increased,
   wherein, when it is determined that the number of the color pages has not increased, executing page reduction suppression processing on the specified pages, and wherein when it is determined that the number of the color pages has increased, not executing page reduction processing on the specified pages.

10. A non-transitory computer-readable storage medium configured to store a program to be executed by an information processing apparatus for implementing the method of claim 9.

* * * * *